Nov. 18, 1952      J. B. BRUCE      2,618,175
AUTOMATIC FLUID BRAKE GOVERNED SPEED REGULATING TRANSMISSION
Filed April 8, 1946      2 SHEETS—SHEET 1
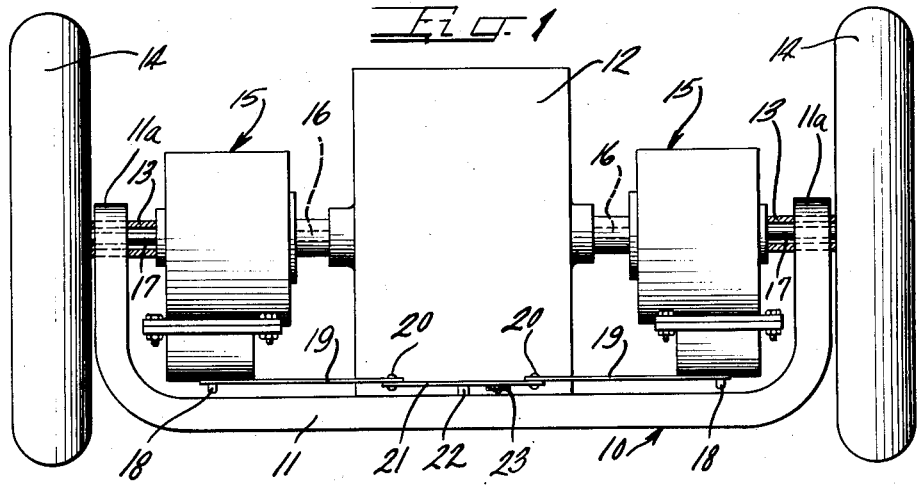
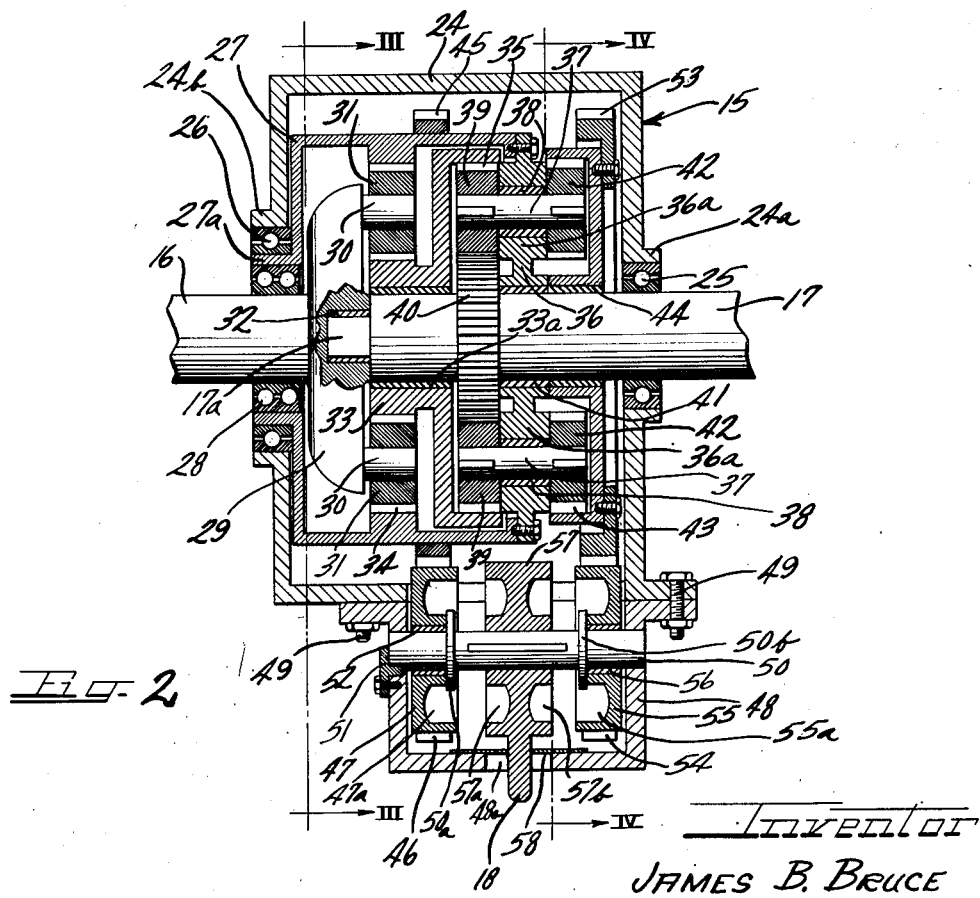
Inventor
JAMES B. BRUCE

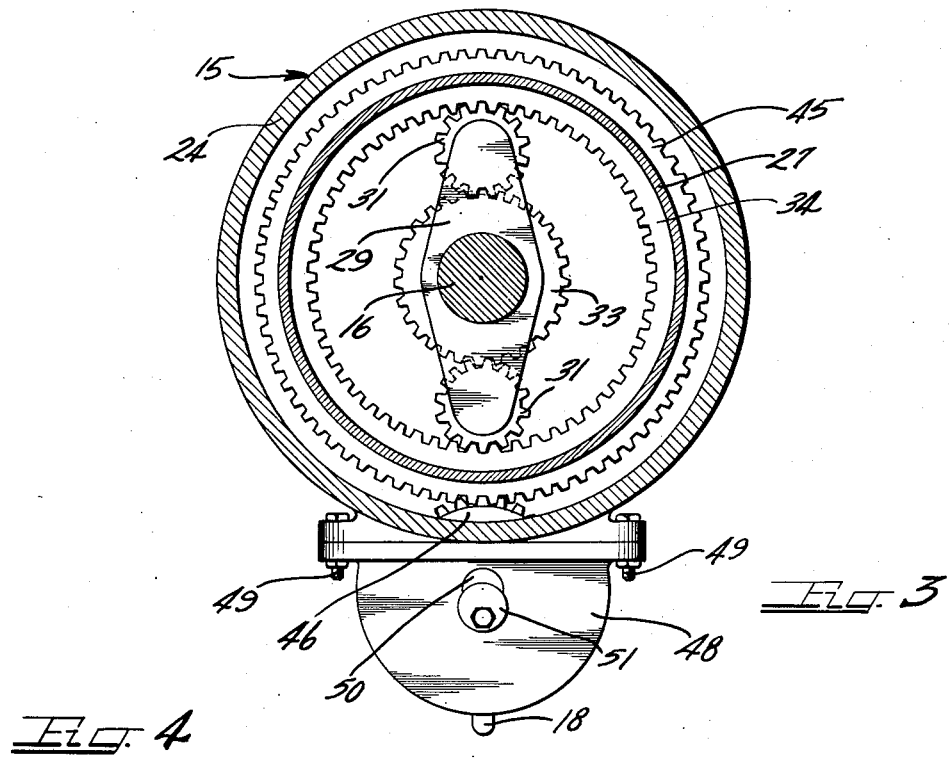
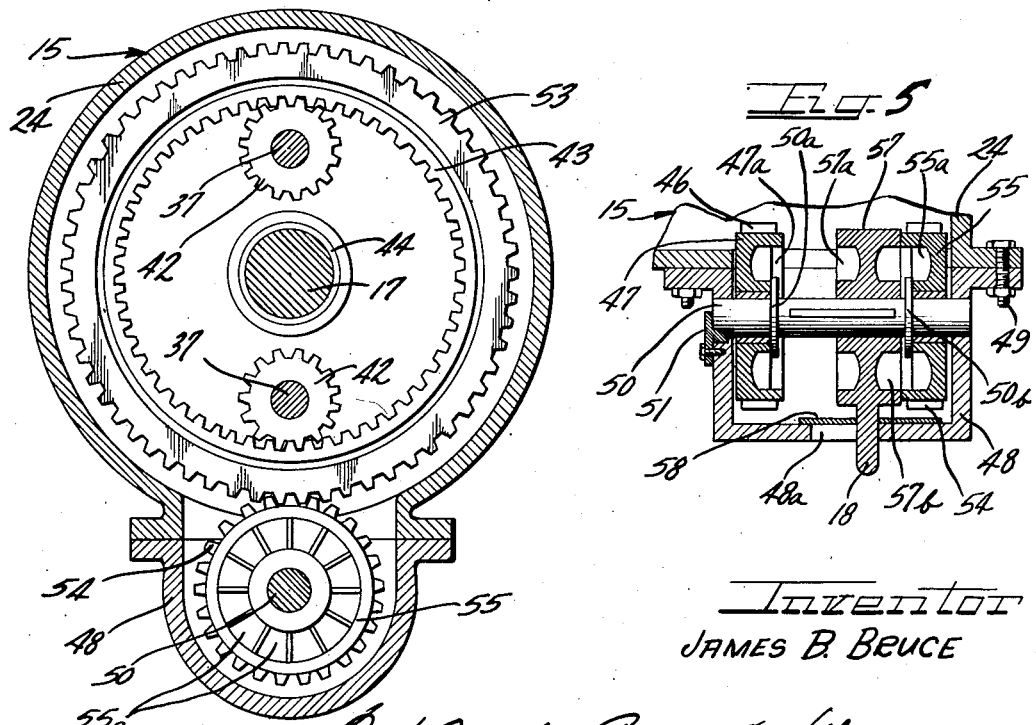

Patented Nov. 18, 1952

2,618,175

UNITED STATES PATENT OFFICE 2,618,175

AUTOMATIC FLUID BRAKE GOVERNED SPEED REGULATING TRANSMISSION

James B. Bruce, Chicago, Ill.

Application April 8, 1946, Serial No. 660,498

8 Claims. (Cl. 74—768)

This invention relates to an automatic transmission having a fluid coupling type of governor or speed regulator. Specifically the invention deals with a planetary gear type transmission adapted to be directly interposed between an engine and a final drive to control the speed of the final drive relative to the engine as well as to function as a differential unit. In a preferred embodiment of this invention the planetary transmissions are mounted with an engine on an axle supporting the final drive wheels of an automotive vehicle with one transmission unit being provided for each wheel. In this arrangement no additional differential is required since each transmission unit will permit variations in relative rotating speeds of the wheels.

According to this invention an input shaft drives a spider with spindles on which a first set of pinion gears or planet gears are rotatably mounted. These planet gears are meshed with a first sun gear and a first internal gear. The first sun gear in turn is secured to a second internal gear. The first internal gear is integral with a drum or cage journaled at opposite ends on the input and output shafts for the unit. A second set of pinions or planet gears are provided inside of the cage in meshed relation with the second internal gear and also with a second sun gear which is secured on the output shaft. Each planet gear of the second set is keyed to a separate shaft journaled on the cage and each of these shafts projects from the cage to carry a planet gear outside of the cage. A third set of planet gears is thereby provided. This third set of planet gears meshes with a third internal gear journaled on the output shaft. The third internal gear in turn is geared through a ring gear to a vaned rotor or pump portion of a fluid coupling. The cage carries a ring gear which is meshed with a second rotor or pump portion of the fluid coupling. A fixed vaned stator is provided in the coupling for sliding movement between the rotors. The coupling is filled with a fluid such as oil and the rotors pump this oil relative to the stator. Spacing of the stator relative to the rotors imparts variable resistance to the pumping of the fluid by the rotors due to the shear action of the pump fluid relative to the fixed vanes on the stator. In this arrangement therefore the coupler imparts controlled selected resistance to rotation of the ring gears respectively secured to the cage and to the third internal gear.

If the cage is restrained against rotation more than the third internal gear, the first planet gears will drive the first sun gear and second internal gear to rotate the second set of planet gears which in turn drive the second sun gear in the reverse direction from the first sun gear. Therefore the output shaft will rotate in an opposite direction to the drive shaft and reversed driving conditions are obtained.

If, on the other hand, the third internal gear is restrained by the coupling more than the cage, the first planet gears will drive the cage to rotate the shafts carrying the second planet gears and since the third internal gear holds these second planet gears against rotation about their own axes they will drive the second sun gear in the same direction as the cage. In such event therefore the output shaft is driven in the same direction as the input shaft.

It will be appreciated of course that slippage always occurs in the fluid coupling and the degrees of restraint of relative movement of the two ring gears can be controlled as desired to produce a widely varying speed range between the input and output shaft. The coupler thereby acts as a fluid governor.

By positioning a planetary gear system of this invention with its fluid governor between the engine and each drive wheel of an automobile a drive arrangement is provided that eliminates all necessity for separate transmissions and differentials since each unit of this invention serves the dual function of an automatic transmission and a differential because the fluid governor of the planetary transmission unit will permit one wheel to speed up relative to the other. At the same time positive driving of both wheels is insured at all times because slippage of one wheel will not release power from the other wheel as in the case of a differential drive.

It is then an object of this invention to provide an automatic fluid brake governed speed regulating transmission.

Another object of this invention is to provide a combination automatic speed control transmission and differential unit.

A still further object of the invention is to provide a compact planetary gear arrangement controlled by a fluid coupling having two rotors and a shiftable stator whereby a wide range of forward and reverse speeds is obtainable.

A still further object of this invention is to provide an automatic speed control transmission having a wide continuous range of driving speeds in both forward and reverse directions.

A specific object of the invention is to provide a planetary gear type transmission wherein relative restraining action on the internal gears thereof is controlled by a fluid governor.

A still further object of the invention is to provide a planetary transmission wherein a first set of planet gears drive a first sun gear and a cage carrying second and third sets of planet gears with the first sun gear driving a second sun gear through the second set of planet gears and with the third set of planet gears driving an internal gear and wherein the relative rotation of the internal gear and the cage is controlled by rotors of a fluid coupling.

Other and further objects of the invention will be apparent to those skilled in the art from the following detailed description of the annexed sheets of drawings which, by way of preferred example only, illustrate one embodiment of the invention.

On the drawings:

Figure 1 is an elevational view, with parts in vertical cross section, of a drive arrangement for an automobile or the like wherein separate transmission units of this invention serve the dual function of transmissions and differentials.

Figure 2 is a longitudinal cross sectional view of the transmission of this invention.

Figure 3 is a transverse cross sectional view taken along the line III—III of Fig. 2.

Figure 4 is a transverse cross sectional view taken along the line IV—IV of Fig. 2.

Figure 5 is a fragmentary longitudinal cross sectional view illustrating a shifted position for the fluid governor or coupling of the transmission.

As shown on the drawings:

The drive assembly shown in Fig. 1 is designated generally by the reference numeral 10 and includes a dropped center type axle 11 carrying an internal combustion engine 12 on the central portion thereof and having upstanding end arms 11a, 11a carrying dead axles 13, 13 which rotatably support driving wheels 14, 14. According to this invention two automatic speed control transmission units 15, 15 are mounted on the axle assembly 11 and 13 between the engine 12 and the wheels 14. These units 15 each have an input shaft 16 driven by the engine 12 and an output shaft 17 driving a wheel 14. A control arm 18 depends from each unit 15 and link rods 19, 19 extend inwardly from these control arms 18 to pins 20, 20 on a rotatable turnbar 21 which is pivoted at 22 on the central portion of the axle 11. A rod connection 23 is provided on the arm 21 to rotate the arm about the pivot 22 thereby shifting the pins 20 for pulling and pushing the links 19, 19 toward and away from each other. This movement reciprocates the control arms 18 to select the speed and direction of movement of the output shafts 17, 17 thereof as will be more fully hereinafter described.

As shown in Fig. 2 the transmission unit 15 of this invention includes a casing 24 having a journal 24a on one side wall thereof mounting a bearing 25 carrying the output shaft 17. The other side or end wall of the casing 24 has a journal 24b mounting a bearing 26. This bearing 26 carries a cage 27 which is disposed within the casing 24 and has an annular portion 27a mounted in the bearing 26 and in turn receiving another bearing 28 supporting the input shaft 16 in rotatable relation.

The input shaft projects into the cage 27 and has a spider 29 on its inner end carrying spindles 30 on which are mounted for rotation a first set of planet gears 31.

The output shaft 17 extends into the cage 27 and has a pilot portion 17a on the inner end thereof projecting in a plain bearing 32 seated in a recess in the spider 29. The bearing 32 and pilot 17a carry the input and output shafts in axial alignment.

A first sun gear 33 is rotatably mounted on a plain bearing 33a disposed on the output shaft 17 adjacent the pilot end 17a thereof. The first set of planet gears 31 are meshed with this sun gear 33 and with a first internal gear 34 integral with or affixed to the cage 27.

A second internal gear 35 is provided in the cage 27 and is affixed to the sun gear 33.

The cage 27 has a cover or end wall 36 affixed thereon in the casing 24. This cover 36 rotatably supports shafts 37 on bearings 38 seated in hollow boss portions 36a thereof. Planet gears 39, forming a second set, are each keyed on a shaft 37 within the cage 27. These planet gears 39 are meshed with the second internal gear 35 and a second sun gear 40 secured on the output shaft 17. A plain bearing 41 rotatably mounts the cover 36 on the output shaft 17 adjacent the sun gear 40.

A third set of planet gears 42 are provided. These gears 42 are keyed on the outer ends of the shafts 37 between the cover 36 of the cage 27 and the adjacent end wall of the casing 24. These planet gears 42 mesh with a third internal gear 43 rotatably journaled on a bearing 44 carried by the output shaft 17.

It will be noted that the hollow bosses 36a of the cover 36 have opposed thrust faces for the second and third planet gears 39 and 42 respectively.

A ring gear 45 is secured around the cage 27 and meshes with a gear 46 around the first vaned rotor 47 of a fluid coupling or speed control unit mounted in a casing 48 secured by means of bolts 49 or the like to the bottom of the casing 24. The casing 48 carries a shaft 50 in spaced parallel relation beneath the output shaft 17. The shaft 50 is held against rotation relative to the casing 48 by means of a locking plate 51.

The rotor 47 is rotatably mounted on a bearing 52 carried by an end portion of the shaft 50. The shaft preferably has a collar 50a thereon forming a thrust bearing for the rotor 47.

The rotor 47 has a plurality of vaned pockets 47a on its inner face for driving or pumping fluid such as transmission oil contained in the casing 48.

The third internal gear 43 has a ring gear 53 secured therearound and meshed with a gear 54 on a second vaned rotor 55 in the casing 48. This second vaned rotor 55, like the first rotor 47, is rotatably mounted on the shaft 50 by means of a plain bearing 56 and a collar 50b on the shaft 50 provides a thrust bearing for this second rotor. The second vaned rotor 55 has vaned pockets 55a on its inner face for pumping fluid in the casing 48.

A vaned stator 57 is slidably keyed on the shaft 50 between the collars 50a and 50b thereof. This stator 57 has a first set of vaned recesses 57a in one face thereof for coacting with the recesses 47a of the first rotor 47 together with a second set of vaned recesses 57b in the opposite face thereof for coacting with the recesses 55a of the second rotor 55.

The operating handle 18 for the unit 15 is integral with the stator 57 and extends through a slot 48a in the bottom face of the casing 48. The slot is sealed by means of a slidable cover 58 secured on the handle 18 and overlying the bottom wall of the casing 48 to span the slot 48a.

As shown in Figs. 2, 4 and 5 the fluid coupling or fluid governor for the unit 15 has opposed rotors respectively driven by the ring gears 45 and 53. These rotors have radially vaned pockets or recesses on the side faces thereof opposed to the side faces of the stator which is positioned therebetween. The stator has similar radially vaned recesses or pockets on its opposed side faces. The stator is shiftable between the two rotors since it is slidably keyed on the shaft 50 as indicated in Figs. 2 and 5. As is customary in fluid couplings the rotors 47 and 55 act as fluid pumps circulating fluid in a direction to drive the stator. Since the stator is held against rotating movement by its keyed connection with the shaft 50 the circulating or pump fluid is placed under shear load and exerts a restraining action on the rotors the extent of which is determined by the spacing of the stator from the respective rotors.

The operating handle 18 for each unit is secured on the stator thereof and is connected through the links 19 with the manually actuated control arm 21 as explained above. Shifting the control arm by means of the rod connection 23 will simultaneously shift the stators in both units 15 of Fig. 1 to maintain the same operating conditions in both units.

*Operation*

When the stator 57 is positioned midway between the rotors 47 and 55 as shown in Fig. 2, the device 15 is in neutral position and the input shaft 16 will not drive the output shaft 17. Under these conditions both gears 45 and 53 are free to rotate. Thus the input shaft 16 will drive the planetary gears 31 around the sun gear 33 to rotate the cage 27 and ring gear 45. Rotation of the cage of course rotates the cover plate 36 to carry the shafts 37 around the output shaft 17 and thereby drive the second planet gears 39 around the second sun gear 40 without rotating the sun gear. This action of course may drive the first sun gear 33 but this is permitted through the first planet gears 31. Rotation of the shafts 37 with the cover 36 and driving of the second planets 39 will rotate the third planets 42 for driving the second ring gear 43. Thus driving action of the input shaft 16 only results in rotation of various gears and the two rotors without driving the output shaft 17.

When the stator 57 is shifted towards the rotor 55 as shown in Fig. 5, driving of the rotor 55 meets with more resistance than driving of rotor 47 and the ring gear 53 is restrained against rotation to a greater extent than is ring gear 45. Assuming, for purposes of explanation, that the gear 53 is held stationary, the planet gears 31 drive the cage 27 to carry the shaft 37 about the shaft 17 in the same direction as the direction of rotation of the shaft 16. As will be described in further detail hereafter, the gear 33 partakes of the rotation of the gear 53 and hence is held against rotation. However, free rotation of the shafts 37 about their own axes is resisted through the third planet gears 42 which mesh with the restraining ring gear 53, thus causing the shafts 37 to rotate about their own axes in direction opposite the direction of rotation imparted to the shaft 16 and thereby to cause the sun gear 40 to be rotated in the same direction as shaft 16. A forward drive connection is thereby established.

It will be observed that the velocity of the portions of the gears 42 in mesh with the internal gear 43 (and hence gear 53) is fixed by the peripheral velocity of gear 43. Moreover, the velocity of the portions of the gears 39 in mesh with gear 35 is held to the peripheral velocity of the gear 43 by the engagement of gears 39 and 42 with shaft 37. Gear 35, and hence gear 33, accordingly rotates with the same angular velocity as does gear 53. Thus, in the case of the foregoing assumed condition of complete stoppage of gear 53, gears 33 and 35 are likewise held against rotation.

If gear 53, and hence gear 33, is permitted to rotate, rotation takes place in the same direction as the direction of rotation of the shaft 16, thereby reducing the rotational velocity of cage 27. Moreover, since the rotational velocity of gear 40 is determined by the difference between the rotational velocity of shaft 37 about the axis of shaft 17 (and hence the rotations of cage 27), and the rotational velocity of the gear 35, a further reduction in velocity of gear 40 takes place at this stage in the mechanism. Thus, as gear 35 is permitted to rotate by releasing the gear 53, the rotational velocity of shaft 17 as compared with shaft 16 is decreased in accord with the degree to which rotation of gear 53 is permitted.

Incremental driving ratios between the input and output shafts are thus established by variation in the relative restraint of rotation of the ring gears 45 and 53 imparted by the stator 57. Thus in the position shown in Fig. 5 the rotor 55 substantially locks the ring gear 53 while the rotor 47 permits relatively free rotation of the ring gear 45. In such conditions a substantially non-slipping drive connection is provided between the input and output shafts. Shifting the stator 47 to the left from the position shown in Fig. 5 will decrease the restraining action on the rotor 55 to automatically increase the speed ratio between the input and output shafts until the neutral position shown in Fig. 2 is reached. Shifting the stator from the neutral position shown in Fig. 2 to the right thereby builds up a change in speed ratios from the highest reduction between output speed and input speed to the lowest reduction or direct drive arrangement. Of course the gear ratios can be such that a greater than direct drive can be obtained.

Shifting the stator to the left from the position shown in Fig. 2 places more restraint on the rotor 47 than on the rotor 55 and thereby holds the ring gear 45 more than the ring gear 53. Under these conditions the input shaft will drive the first planet gears 31 to drive the first sun gear 33 and this sun gear in turn will drive the second internal gear 35 in the same direction as the input shaft. However, the second internal gear 35 drives the second planet gears 39 which are held against rotation about the shaft 17 by the non-rotating or slowly rotating cover 36 of the casing 27 and drive the second sun gear 40 to rotate the output shaft 17 in the reverse direction from the direction of rotation of the input shaft 16. Under these conditions a reverse driving arrangement is provided. The reverse driving arrangement has the same speed ratio changes as the forward driving arrangement since the stator 57 acts on the rotor 47 in the same manner as it acts on the rotor 55.

Since the engine 12 drives the input shafts 16 at the same speeds and since the link arrangement for the control arms 18 of the units 15 shown in Fig. 1 provides for simultaneous shifting of the control arms, the wheels 14 will be driven at uniform speeds in either forward or reverse direction at the desired speed ratio relative to the engine speed. This is determined by a manual push or pull setting of the control rod connector 23. However, if one wheel 14 should slip and lose traction the other wheel 14 would still continue to receive power from the engine. In addition if one wheel 14 moves forward or backward faster than the speed determined by the output shaft 17 of the unit 15, as for example when the vehicle is turning a corner, the unit 15 will readily permit this movement. Therefore the units serve in the dual capacity of a differential without however causing both wheels to lose driving power whenever one of the wheels loses traction. In this respect the units overcome a serious deficiency of differential drives.

From the above descriptions it will be understood that the invention provides a simplified compact combination automatic speed control transmission and differential unit.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A speed control transmission which comprises a casing, an output shaft rotatably journaled in said casing, a cage rotatably journaled in said casing, an input shaft rotatably journaled in said cage, a driving spider on said input shaft in said cage, a first set of planet gears driven by said spider in said cage, a sun gear rotatably mounted on said output shaft in said cage meshed with said first planet gears, a first internal gear integrally fixed to said cage and meshed with said first planet gears, an internal gear in said cage carried by said first sun gear, a cover on said cage journaled on said output shaft, spindles rotatably mounted in said cover around said output shaft, second planet gears keyed on said spindles in said cage, third planet gears keyed on said spindles outside of said cage, a second sun gear secured on said output shaft meshed with said second planet gears, said second internal gear being meshed with said second planet gears, a third internal gear journaled on said output shaft and meshed with said third planet gears, ring gears respectively secured on said cage and on said third internal gear, a secondary casing secured on the bottom of said first mentioned casing and fixedly carrying a shaft in spaced parallel relation beneath said output shaft, spaced opposed fluid coupling type vaned rotors rotatably mounted on said shaft in said secondary casing and having gears therearound respectively meshed with said ring gears, a vaned coupling type stator slidably mounted on said shaft in said secondary casing and held on said shaft against rotation, said stator and said rotors having opposed vaned pockets for circulating fluid, and means for shifting said stator between said rotors to vary resistance to fluid circulated by said rotors thereby varying the restraining action on said ring gears and controlling the speed ratios between said input and output shafts through said planet gears, sun gears and internal gears.

2. A speed control transmission comprising an input shaft, an output shaft, a cage journaled on said shafts, first and second sets of connected gear sets in said cage each including a sun gear, planet gears and an internal gear in intermeshed relation, said internal gear of the first set being connected to said cage, means connecting the input shaft and planet gears of the first set, the sun gear of the last set being secured to the output shaft, a third internal gear operatively connected to said second planetary gear, a fluid reservoir for fluid, a regulator having a first rotor in driven engagement with said cage and a second rotor connected to the third internal gear for rotation therewith, and means for selectively varying resistance to rotation of said rotors to control the relative speeds and relative direction of rotation of said input shaft and said output shaft.

3. A speed control transmission comprising first and second connected gear sets each including a sun gear, planet gears and an internal gear in intermeshed relation, a third internal gear operatively connected to the planet gears of said second set, and a fluid type coupling selectively controlling relative rotation of the internal gear of said first set and the planet gears of said second set through said third internal gear to vary the speed ratio of the transmission.

4. A transmission comprising a cage, a driven spider in said cage, a first set of planet gears rotatably mounted on the spider, a first sun gear meshed with said first planet gears, a first internal gear meshed with said first planet gears, a second internal gear carried by said first sun gear, a second set of planet gears meshed with said second internal gear, a second sun gear meshed with said second planet gears, an output shaft secured to said second sun gear, angularly spaced pinion shafts journaled in said cage journaling said second planet gears, a third set of planet gears keyed on said pinion shafts, a third internal gear driven by said third planet gears, first and second ring gears carried by said first and third internal gears respectively, a reservoir for fluid, vaned pump rotors in said reservoir meshed with said ring gears, a pump stator between said rotors selectively shiftable into closely spaced relation thereto for imparting resistance to the pumping of fluid by said rotors and to the rotation of the rotors to create relative degrees of restraining action on said ring gears to selectively reverse the direction of rotation of said output shaft relative to said spider and to selectively vary the speed ratio between the spider and the output shaft.

5. In a speed control transmission including first and second ring gears, first and second shafts and epicyclic gear means connecting the first and second gears and the first and second shafts so that selective braking of the ring gears will control the relative rotation and speed ratio of the shafts, the improvement of a fluid reservoir, fluid coupling type rotors in said reservoir meshed with said first and second ring gears and a fluid coupling stator between said rotors and selectively shiftable into closely spaced relation to said rotors to vary resistance to rotation thereof and determine the relative rotation and speed ratio of the shafts.

6. In a transmission having first, second and third members rotatable on a common axis, first gear means on said first member, second gear means on said second member, third gear means rotatably carried by said third member and in epicyclic train with said first and second gear means, a first shaft coupled to one of said members, a second shaft, and differential gear means connecting the other two members to said second shaft, a pair of rotors, means connecting each rotor to one of said other two members, and a stator between said rotors and selectively and variably shiftable into closely spaced relation to the rotors to vary resistance to rotation thereof and determine the relative rotation and speed ratio between the shafts.

7. A speed control transmission comprising first and second connected gear sets each including a sun gear, planet gears and an internal gear in intermeshed relation, means for driving the planet gears of the first set, a drive shaft driven by the sun gear of the second set, a third internal gear operatively connected to planet gears of the second set, and a member selectively and variably shiftable into frictional braking relationship to the internal gear of the first set and said third internal gear to vary the relative rotation and speed of said shafts.

8. A speed control transmission comprising first and second gear sets each including a sun gear, planet gears and an internal gear in intermeshed relation, a first shaft connected to the planet gears of the first set, means connecting the sun gear of the first set with the internal gear of the second set, means connecting the internal gear of the first set with the planet gears of the second set, a second shaft connected to the sun gear of the second set, a planet gear connected to each of the planet gears of the second set and rotatable therewith, an internal gear meshing with the last-mentioned planet gears, and means for selectively and variably restraining rotation of the last-mentioned internal gear and the internal gear of the first set to vary the relative rotation of said first and second shafts.

JAMES B. BRUCE.

REFERENCES CITED

The following references are of record in the file of this patent:

UNITED STATES PATENTS

| Number | Name | Date |
|---|---|---|
| 623,820 | Patin | Apr. 25, 1899 |
| 812,886 | Sears | Feb. 20, 1906 |
| 1,343,944 | Tomoda | June 22, 1920 |
| 2,021,526 | Stock | Nov. 19, 1935 |
| 2,039,210 | Bugatti | Apr. 28, 1936 |
| 2,143,711 | Murray | Jan. 10, 1939 |
| 2,191,907 | De Fillippis | Feb. 27, 1940 |
| 2,219,215 | Anderson | Oct. 22, 1940 |
| 2,241,189 | Dick | May 6, 1941 |
| 2,310,513 | Burns | Feb. 9, 1943 |
| 2,341,122 | Schmidt | Feb. 8, 1944 |
| 2,341,512 | Burtnett | Feb. 15, 1944 |
| 2,388,704 | Potter | Nov. 13, 1945 |
| 2,419,372 | Schneider | Apr. 22, 1947 |
| 2,424,384 | Comstock | July 22, 1947 |

FOREIGN PATENTS

| Number | Country | Date |
|---|---|---|
| 97,769 | Switzerland | Feb. 1, 1923 |
| 463,843 | Great Britain | Apr. 7, 1937 |